(12) United States Patent
Anderson et al.

(10) Patent No.: US 6,678,005 B2
(45) Date of Patent: Jan. 13, 2004

(54) METHOD AND SYSTEM FOR DISPLAYING VIDEO SIGNALS (75) Inventors: Eric D. Anderson, Hudson, WI (US); Robert R. Hoffman, Jr., Mounds View, MN (US)

(73) Assignee: Micron Electronics, Inc., Boise, ID (US)

( * ) Notice: Subject to any disclaimer, the term of this patent is extended or adjusted under 35 U.S.C. 154(b) by 0 days.

(21) Appl. No.: 10/379,829

(22) Filed: Mar. 3, 2003

(65) Prior Publication Data

US 2003/0156219 A1 Aug. 21, 2003

Related U.S. Application Data

(63) Continuation of application No. 09/164,170, filed on Sep. 30, 1998.

(51) Int. Cl.[7] ............................ H04N 5/44; H04N 5/445; H04N 3/27; H04N 7/08
(52) U.S. Cl. ....................... 348/553; 348/554; 348/563; 348/564; 348/569; 348/473
(58) Field of Search ................................. 348/553, 554, 348/563, 564, 473, 569, 552; 710/5, 14

(56) References Cited

U.S. PATENT DOCUMENTS

| | | | | |
|---|---|---|---|---|
| 4,821,112 A | * | 4/1989 | Sakamoto et al. ........... | 348/555 |
| 5,635,989 A | * | 6/1997 | Rothmuller ................. | 348/563 |
| 5,659,366 A | * | 8/1997 | Kerman ..................... | 348/460 |
| 5,737,030 A | * | 4/1998 | Hong et al. ................ | 348/564 |
| 5,774,188 A | | 6/1998 | Ngo et al. | |
| 5,790,203 A | | 8/1998 | Maldonando | |
| 5,926,207 A | * | 7/1999 | Vaughan et al. ........... | 725/139 |
| 5,936,679 A | * | 8/1999 | Kasahara et al. .......... | 348/553 |
| 6,064,449 A | * | 5/2000 | White et al. .............. | 348/732 |
| 6,130,721 A | | 10/2000 | Yoo et al. | |
| 6,131,128 A | * | 10/2000 | Lee ............................. | 710/5 |
| 6,154,257 A | * | 11/2000 | Honda et al. .............. | 348/558 |
| 6,281,937 B1 | * | 8/2001 | Tomida et al. ............. | 348/553 |
| 6,288,750 B1 | * | 9/2001 | Yamada et al. ............ | 348/553 |

* cited by examiner

*Primary Examiner*—John Miller
*Assistant Examiner*—Paulos Natnael
(74) *Attorney, Agent, or Firm*—Knobbe, Martens, Olson & Bear LLP (57) ABSTRACT

A method and system for notifying a viewer of the arrival or presence of one or more video input signals in a video display system, such as a personal computer (PC) or television (TV) system. If a video signal is already present, the system may optionally notify a viewer of the termination or absence of the video signal. The invention further provides the viewer with the opportunity to dynamically select the video source to view. Upon sensing the presence of a new video signal, the system alerts the viewer who may then select whether to view the new video signal or maintain prior viewing status.

20 Claims, 6 Drawing Sheets

METHOD AND SYSTEM FOR DISPLAYING VIDEO SIGNALS

RELATED APPLICATIONS

This application is a continuation, and hereby incorporates by reference the entire disclosure, of U.S. patent application Ser. No. 09/164,170, now U.S. Pat. No. 6,587,154 entitled "METHOD AND SYSTEM FOR DISPLAYING VIDEO SIGNALS", which was filed on Sep. 30, 1998.

BACKGROUND OF THE INVENTION

1. Field of the Invention

The invention relates generally to the management of video display systems, such as computer monitors. More particularly, the invention relates to the selection of video signals in a video system having multiple input.

2. Description of the Related Art

In recent years, the use of multimedia applications has steadily spread to many fields of technology. The term "multimedia" commonly refers to the fusion of information, communications, and visual media in a single processing system. With the evolution of the public Internet, several computer-based systems now offer multimedia applications for the communication and processing of data, voice, image/graphics, and video. Additionally, there are several television-based systems currently in use and development, such as interactive television (TV) or Web TV, which also support multimedia applications. The interactive TV concept combines the Internet and TV to enable viewers to access additional information about the programs they are watching and act on it through the Internet. The interactive TV experience may occur on a personal computer (PC) with a tuner card, such as those used with Intel's Intercast Technology. Alternatively, interactive TV may also be based on a standard television set with an external device supporting interactive access.

There are at least two types of display systems available today: one for PC systems, and another for TV systems. The PC display system typically includes a display unit, processing circuit, and display adapter. The display adapter is a device which transforms text, graphics, or video signals from digital form to analog form for display by the display unit. The display unit may be a cathode ray tube (CRT) or liquid crystal display (LCD) device capable of displaying text, graphics, or video. On the other hand, the TV display system typically includes a monitor, demodulator, and tuner. The tuner and demodulator supply one or more video signals for display by the monitor.

A variety of video standards are used in connection with PC systems, including MDA, CGA, HGC, EGA, PGA, VGA, MCGA, Super VGA, 8514/A, and XGA. In the case of TV systems, a different variety of video standards are used including National Television System Committee (NTSC), Phase Alternating Line (PAL), and Systeme Electronique Couleur Avec Memoire (SECAM).

As PC and TV systems merge closer together, there is a heightened need to support multiple video inputs to accommodate for a variety of video signals and formats. Moreover, accommodating for multiple video inputs may be required when receiving video signals from dedicated multiple video sources, even though the video signals may be in the same format. When receiving video signals from multiple video sources at the same time (i.e., concurrently), a user has to manually select one video source to override one or more other video sources. For example, when a cable TV signal and a video cassette recorder (VCR) signal are received concurrently, a TV user must press one or more control buttons to select which of the two video signals to display on the TV monitor. In a PC system, a PC user may alternatively instruct the PC (e.g., by specialized programming) to prioritize video input sources in case of concurrent arrival of multiple video signals. Once the user selects a particular video source, the user may not view video signals from other video sources. To view video signals from other sources, the user has to re-press control buttons or reprogram specialized instructions. More particularly, the user is unable to accommodate for recognizing arrival (i.e., new presence) or termination (i.e., new absence) of other video signals into and from the PC or TV system.

Therefore, there is a need in video display technology to accommodate for concurrent presence of multiple video signals in a PC or TV environment. The new system and method should enable a user to dynamically select multiple video sources as the user desires.

SUMMARY OF THE INVENTION

In accordance with one embodiment, the invention provides a system for displaying video signals. The system comprises at least one detection circuit configured to monitor the arrival or presence of at least one of a plurality of video signals at at least one of a plurality of video inputs. The system further comprises a processing circuit, electrically coupled to the detection circuit, configured to notify the user of the presence of at least one of the plurality of video signals. In the event that only one of the plurality of video signals is present, the processing circuit is configured to automatically select the only one of the plurality of video signals for display. On the other hand, in the event that more than one of the plurality of video signals are present at the plurality of video inputs, the processing circuit is configured to prompt the user to select one of the more than one video signals for display. In another embodiment, the system comprises means for monitoring the arrival or presence of at least one of a plurality of video signals at at least one of a plurality of video inputs. The system further comprises means for notifying the user of the presence of at least one of the plurality of video signals. In the event that only one of the plurality of video signals is present, the notifying means is configured to automatically select the only one of the plurality of video signals for display. In the event that more than one of the plurality of video signals are present at the plurality of video inputs, the notifying means is configured to prompt the user to select one of the more than one video signals for display.

In yet another embodiment, the invention provides a method of displaying video signals to a user. The method comprises monitoring the arrival or presence of at least one of a plurality of video signals at at least one of a plurality of video inputs. The method further comprises notifying the user of the presence of at least one of the plurality of video signals. The method further comprises automatically selecting only one of the plurality of video signals for display, provided that only one of the plurality of video signals is present. The method further comprises providing the user with an option to select one of the plurality of video signals for display, provided that more than one of the plurality of video signals are present at the plurality of video inputs.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF THE INVENTION

Figure 1:
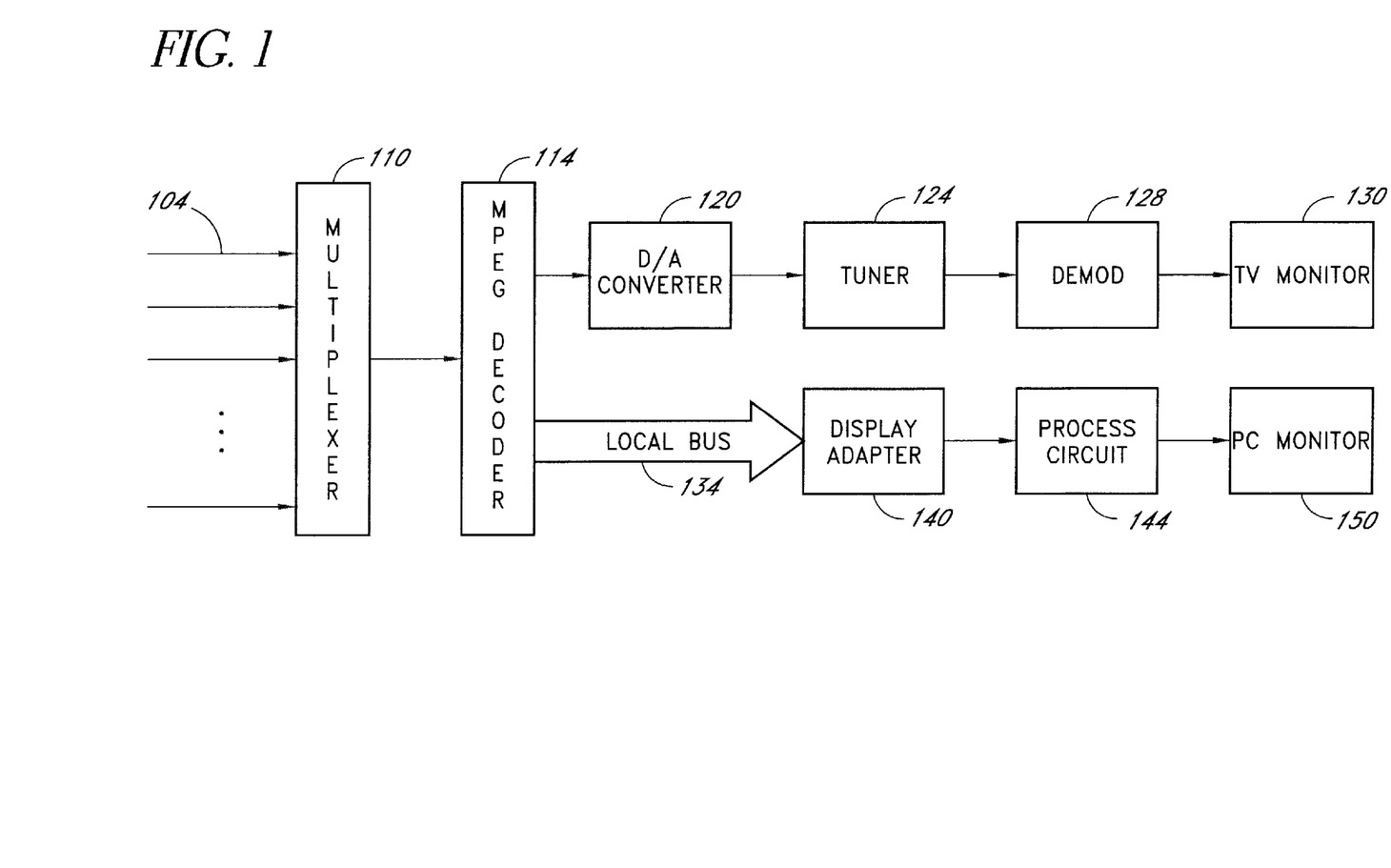
FIG. 1 is a block diagram of an exemplary video system having multiple video inputs.

To better understand the invention, a brief description of functional components of an exemplary video system is first provided. FIG. 1 is a block diagram of an exemplary video system 100 having multiple video inputs. A multiplexer (MUX) 110 receives one or more video input signals (VIS) 104 from one or more video sources (not shown in this figure). The MUX 110 may receive the VIS 104 over copper, fiber-optic, or air media using an appropriate receiver. The MUX 110 may employ any method of coordinating the transfer of concurrent multiple input signals into a single output. For instance, the MUX 110 may comprise an electronic switch which allows connection of a predetermined VIS 104 to the output of the MUX 110. Alternatively, in more sophisticated systems, the MUX 110 may employ multiplexing techniques such as time division multiplexing (TDM), frequency division multiplexing (FDM), or other similar methods which are known in the art. In case of analog video, the VIS 104 may be in any transmittable video format, such as NTSC, PAL, or SECAM. In case of digital video, the video format of VIS 104 may be in a serial digital interconnect (SDI), serial digital data interconnect (SDDI), Fiber Channel (FC), synchronous digital hierarchy (SDH), or other video formats which are known in the art. In addition to radio frequency (RF) channel medium (e.g., cable, satellite, or VHF/UHF), unconventional transmission methods such as the Internet and/or asynchronous transfer mode (ATM) media may be predominant methods of transmission for all kinds of video signal formats.

To accommodate for the transmission of video signals over such unconventional transmission media, video information may be compressed using any of a variety of compression techniques which are known in the art. One example of such a compression technique may comply with a motion picture expert group (MPEG) standard. MPEG is an international standard which defines the display of video at 25 images per second having a transmission rate of 150–300 Kbytes per second. MPEG allows the display of full screen and full motion video with CD sound quality using relatively little memory. MPEG-1 is another set of international standards for the compression and decompression of digital video signals. MPEG-1 specifies a video resolution of 352×240 pixels compressed at a rate of 30/25 frames per second over a bandwidth of 150 Kbytes per second. MPEG-2 is yet another standard which specifies a video resolution of 720×480 pixels over a bandwidth ranging from 0.5 to more than 2 Mbytes per second. In general, MPEG-2 may be used for high definition television (HDTV) and digital versatile disk (DVD) drives. DVD is an optical disk having a capacity of up to 17 Gbytes, which contain full-length motion pictures for viewing on a PC.

If necessary and, particularly, when the VIS 104 is compressed prior to initial transmission, the video system 100 may employ an MPEG decoder 114 to decompress the VIS 104 for processing. In case of analog TV systems, a digital-to-analog converter (DAC) 120 may be required to convert the VIS 104 from digital to analog form. For instance, the DAC 120 may convert SDI signals into NTSC format for further processing. As noted above, a tuner 124 and a demodulator 128 may be used to supply a TV monitor 130 with the appropriate video signal for display by the monitor 130. In case of digital TV systems (e.g., HDTV), the HDTV may employ appropriate processing circuitry to display digital VIS 104 by a HDTV monitor.

In case of PC systems, a large amount of video information may be communicated among a video card, a video processor (e.g., CPU), and a system memory over a video interface. A video interface may be defined as the medium by which a video processor and memory communicate with the rest of the PC. The video interface may comprise a local bus 134, which may be an industry standard architecture (ISA), VESA local (VLB), peripheral component interconnect (PCI), an accelerated graphics port (AGP), or other similar video bus which is known in the art. As noted above, a display adapter 140 (e.g., a video card) may be used to transform text, graphics, or video signals from digital form to analog form for display by a PC monitor 150. The PC monitor 150 may be a cathode ray tube (CRT) or liquid crystal display (LCD), or any other device which is capable of displaying text, graphics, or video.

Figure 2:
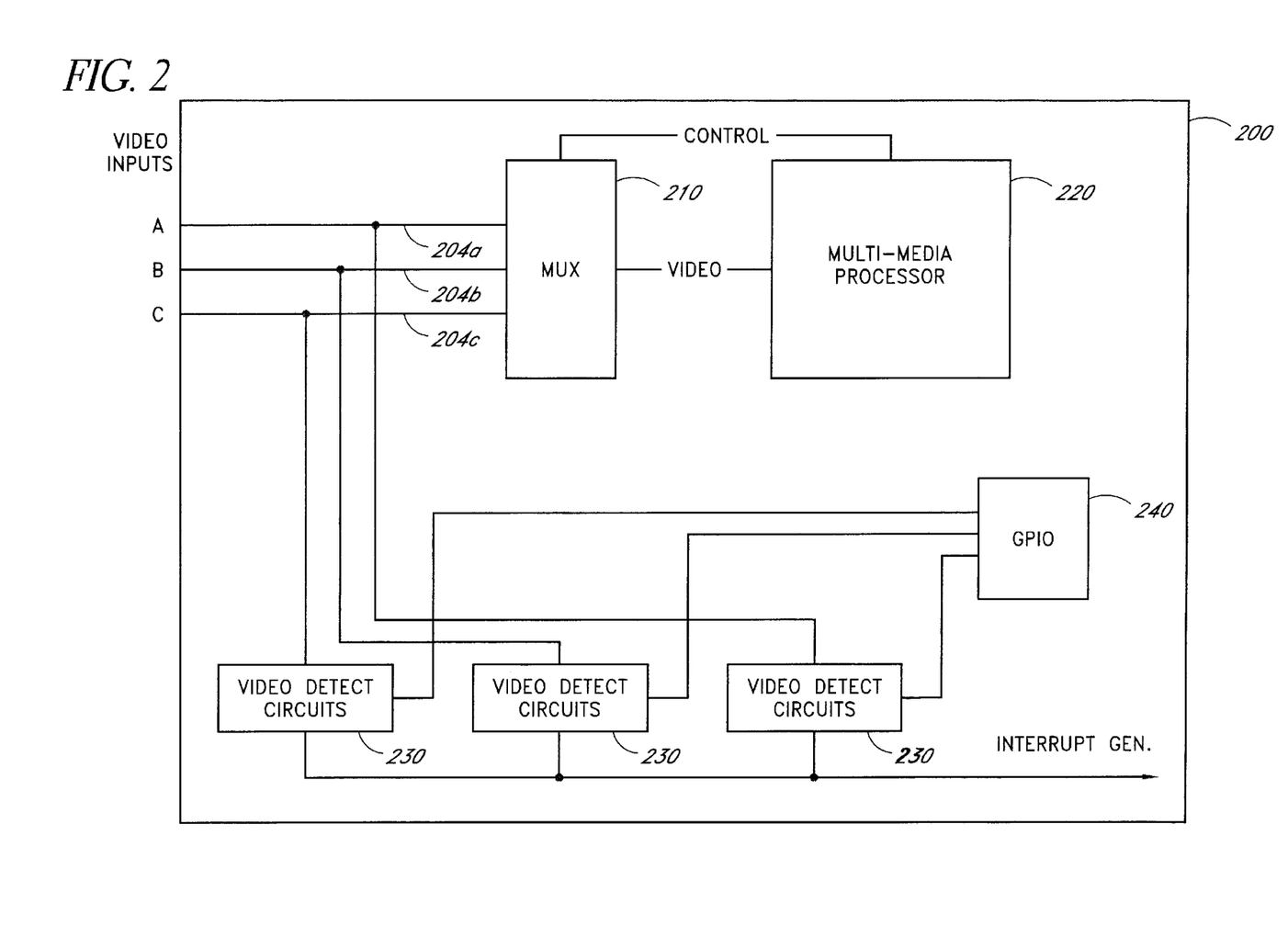
FIG. 2 is a block diagram of one embodiment of the video system of the invention.

FIG. 2 is a block diagram of one embodiment of the video system of the invention. The video system 200 may comprise an analog or digital video system which is based on a TV or PC system architecture. A multiplexer (MUX) 210 may receive one or more video input signals (VIS) 204 for processing. Depending on its multiplexing technique, the MUX 210 communicates one of the VIS 204 to a multimedia processing circuit (MPC) 220 which may include some or all of the functional blocks illustrated in the video system 100 of FIG. 1. The MPC 220 may also include a processor programmed with instructions to perform or cause performance of video signal processing functions described above. Such a processor may be adapted for video signal processing, such as those used in PC or digital TV systems. An example of such a processor may be the Mpact media processor by Chromatic Research, Inc.

Moreover, the video system 200 comprises one or more video detect circuits (VDC) 230 which monitors the activity of the VIS 204 ports. As used herein, the term "activity" refers to any signal activity associated with or related to video signals (i.e., VIS 204) including, without limitation, arrival, presence, termination, or absence of the VIS 204 at its respective port. The VDC 230 monitors the presence and absence of VIS 204 signals arriving into the video systems 200. Each VDC 230 is electrically coupled to its respective VIS 204. In this embodiment, three VIS 204 and three respective VDC 230 are depicted in FIG. 2. However, depending on the desired application, the video system 200 may employ any number of VIS 204 and VDC 230. Moreover, in this embodiment, one VDC 230 monitors one VIS 204. However, several VDC 230 may be implemented as one video detect unit to monitor one or more VIS 204. Finally a general processor input/output (GPIO) 240 communicates with the one or more VDC 230 to monitor and reset each VDC 230 after it detects a VIS 204. The GPIO 240 may be a 37M707 processor manufactured by SMC.

Upon detecting the presence of a VIS 204, the respective VDC 230 may generate an interrupt in a form of one or more logic level signals to the MPC 220. If the presence of only one VIS 204 is detected, then the MPC 220 instructs the MUX 210 to connect the port receiving the active VIS 204 to the output of the MUX 210. The MPC 220, in turn, processes and displays the active VIS 204 using a display monitor (not shown in this figure). If, on the other hand, two or more VDC 230 detect the presence of two or more VIS 204, then the two or more VDC 230 may generate two or more interrupts to the MPC 220. Accordingly, the MPC 220 may alert (i.e., prompt) a system user with a message on the display monitor to select one of the two or more VIS 204 for viewing. The user may then respond to the MPC 220 by pressing one or more control buttons (located on the screen or elsewhere) or clicking a mouse. Upon selecting a VIS 204 to view, the MPC 220 may instruct the MUX 210 accordingly.

It is sometimes desirable to prompt the user to select a video port each time a new VIS 204 is detected by the respective VDC 230. For instance, if a user is viewing a VIS 204a, and a video signal is detected at the VIS 204c port, then the MPC 220 will prompt the user to select whether to view the newly detected VIS 204c or continue viewing VIS 204a. Alternatively, if the user is already viewing a VIS 204, the MPC 220 may optionally be configured not to prompt the user to select a video port even if another VIS 204 is newly detected. This option may allow the user to view a video source without interruption due to the presence or arrival of another VIS 204.

Moreover, upon detecting the absence of one or more VIS 204, the respective one or more VDC 230 may generate one or more interrupts in a form of one or more logic level signals to the MPC 220. Consequently, the MPC 220 may notify the user with a message on the user's display monitor. The message may comprise, among other things, the code or name which identifies one or more video sources whose absence is detected. The user may acknowledge such notification by pressing one or more control buttons or clicking a mouse. The MPC 220 may notify the user of the absence of a VIS 204 port each time a new absence of a VIS 204 is detected by the respective VDC 230. Alternatively, however, if the user is already viewing a VIS 204, the MPC 220 may optionally be configured not to notify the user to select a video port even if the absence of another VIS 204 is newly detected. This option may allow the user to view a video source without interruption due to the absence or termination of another VIS 204.

Figure 3:
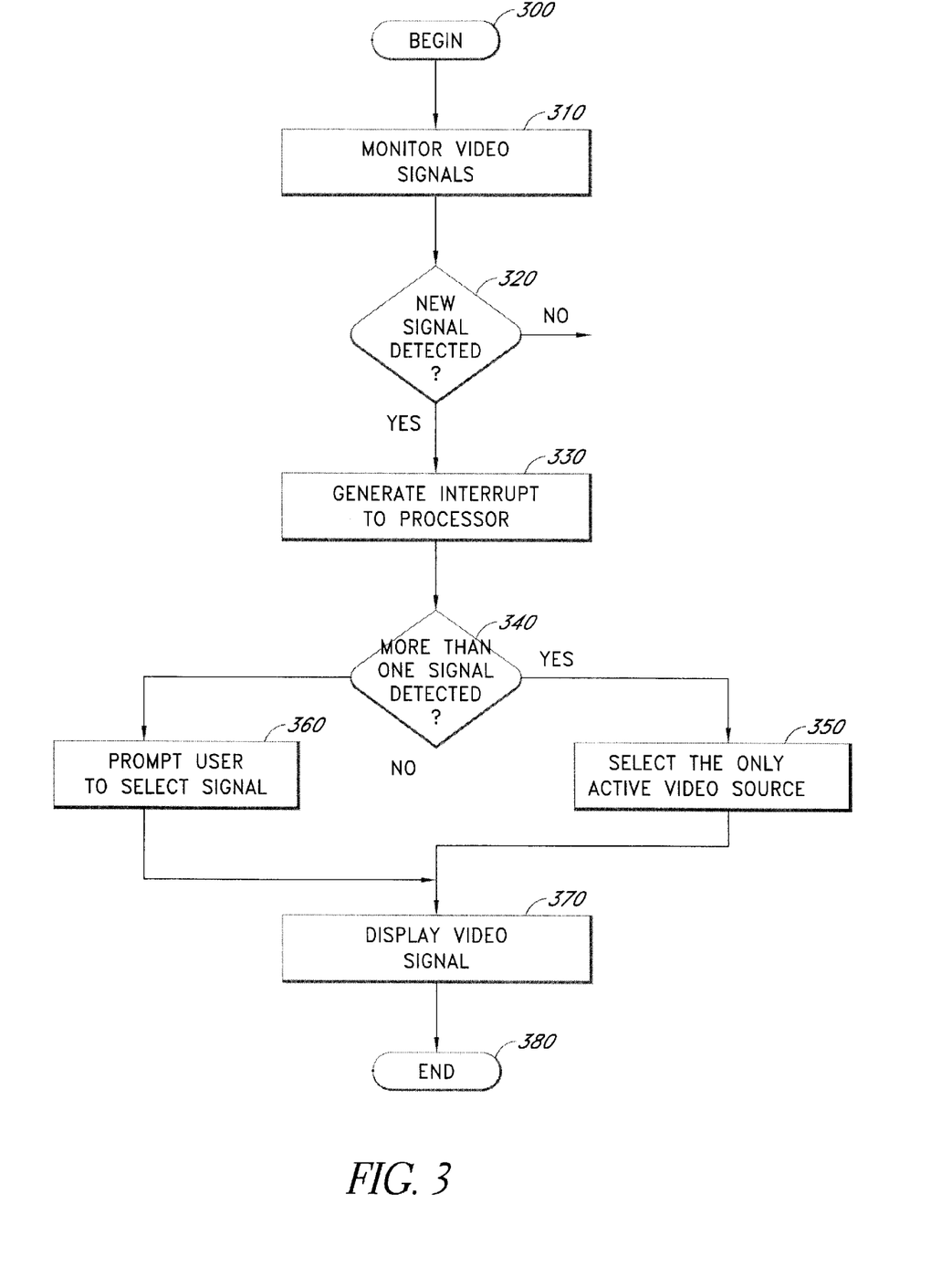
FIG. 3 is a flowchart describing the steps executed by the video system of FIG. 2.

FIG. 3 is a flowchart describing the steps executed by the video system 200. The process begins at step 300 when the video system 200 is powered-up or initialized. At step 310, the VDC 230 monitors the arrival or, if already present, termination of one or more video signals (i.e., VIS 204) from one or more video sources. At step 320, the VDC 230 determines whether one or more new VIS 204 are detected at an input port. Hence, if one or more VIS 204 are already present, the VDC 230 takes no affirmative action. The VDC 230 returns to the monitoring step at 310. The duration of time between two consecutive monitoring steps may be determined and programmed as desired by the system operator. On the other hand, if the arrival of one or more new VIS 204 is detected at step 310, then the process proceeds to step 330. At step 330, the VDC 230 generates one or more interrupts to notify the MPC 220 of the presence (or absence) of one or more VIS 230.

At step 340, the MPC 220 records the one or more interrupts and determines if more than one VIS 204 is detected. If the arrival of only one VIS 204 is detected, and no other VIS 204 are active, then the MPC 220 may automatically display the only active video source at step 350. Alternatively, however, the system operator may desire to instruct the video system 200 to always prompt the user to select to view a VIS 204, even if only one VIS 204 is active. On the other hand, if the arrival of more than one new VIS 204 is detected, then the MPC 220 may prompt the user to select the video source the user desires to view. Consequently, at step 370, the video system 200 displays the desired VIS 204 to the user. The process terminates at step 380. In practice, unless instructed otherwise, the video system 200 returns to the monitoring step at 310 and, hence, does not terminate.

Figure 4:
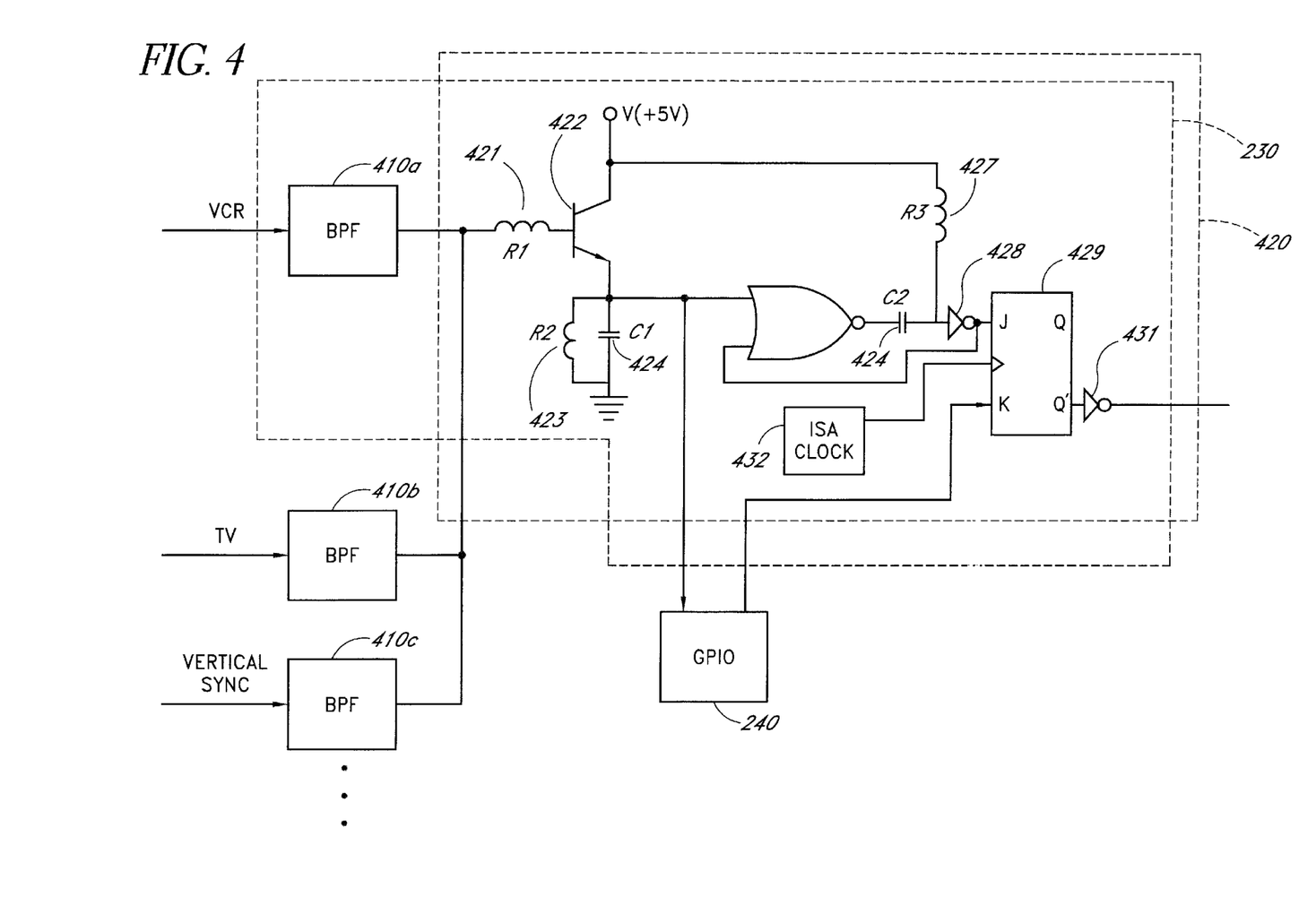
FIG. 4 is a block diagram of one embodiment of the video detect circuit of the video system of FIG. 2.

FIG. 4 is a block diagram of one embodiment of the VDC 230 of the video system 200. It is worth noting that, depending on the technical specifications of the video system, there may be many variations of the VDC 230 which will appear obvious from the following description to one having ordinary skill in the art. In this description, an industry standard architecture (ISA) based video system is used to implement the VDC 230. However, any other types of systems having an interrupt scheme may be used including, without limitation, extended ISA (EISA) and peripheral component interconnect (PCI).

As shown in FIG. 4, the VDC 230 comprises one or more bandpass filters (BPF) 410 electrically connected to one or more video sources (not shown in this figure) supported by the video system 200. For instance, the video system may support TV broadcasting channels, vertical sync channels, and many others. Hence, a BPF 410a may be used to detect video signals in the very high frequency (VHF) range of about 30–300 MHz. A BPF 410b may be used to detect video signals in the ultra high frequency (UHF) range of about 300–3000 MHz. A BPF 410c may be used to detect video signals directly received in the range of 50–100 Hz. Typically, a video cassette recorder (VCR) provides an output on VHF channels 3 and 4. Hence, a VCR output may be connected to a circuit with a VHF BPF (i.e., BPF 410a). A satellite video signal may be in a MPEG format and, hence, may be connected through a filter with a BPF covering MPEG frequencies, i.e., 90 (MPEG1)–64 (MPEG4) kHz.

It is desirable to have the output signal of a BPF 410 conform to the logical state levels recognized by the video system 200. For instance, if the video system is a 5-Volt based system (i.e., one that recognizes 0 V as a low logical state and 5 V as the high logical state), it is desirable to have the output of a BPF 410 be in the range of 0–5 volts. Moreover, the BPF 410 is selected so that, whenever there exists any minimal video activity by a VIS 204, its output signal is able to activate, drive, or trigger a subsequent component such as a transistor. Bandpass filters having lower and upper cutoff frequencies in various ranges of frequencies are known in the art.

The VDC 230 further comprises one or more interrupt generation circuits (IGC) 420 electrically connected to the one or more BFP 410. Upon detecting a VIS 204, the IGC 420 issues an interrupt signal to the MPC 220 (FIG. 2). The IGC 420 may comprise a set of resistors and capacitors coupled to a digital generation logic. Hence, the design of the IGC 420 may be accomplished in a variety of ways. Moreover, the following description is for an IGC 420, which detects and generates an interrupt for a single VIS 204. Hence, using other BPFs (e.g., BPF 410b, 410c, etc.), the following IGC 420 may be duplicated to detect and generate an interrupt for virtually any desired number of VIS 204.

In one embodiment, the IGC 420 is a one-shot interrupt generator which comprises a resistor R1 421 connected to the base of a bipolar Transistor 422. The emitter of the Transistor 422 may be terminated by connecting a resistor R2 423 in parallel with a capacitor C1 424 to ground. The combination of these resistors, capacitor and transistor provides a signal of logical state level 1 (i.e., high) after a predetermined period from the occurrence of a signal activity on the output of the BPF 410a. The occurrence of signal activity is typically in response to detecting of a video signal VIS 204.

The voltage signal at the emitter of the Transistor 422 is connected into a first input of a NOR Gate 425. The output of the NOR Gate 425 is connected to one end of a capacitor C2 426. The voltage signal at the output or, in this case, collector of the Transistor is connected to the other end of C2 426 via a resistor R3 427. The other end of C2 426 is fed into an inverter 428 whose output is fed back into a second input of the NOR Gate 425. Examples of the inverter 428 include the SN7405 manufactured by TI. The output of the inverter 428 may be fed into a J input of a JK flip-flop (JKFF) 429. As is well known in the art, the characteristics equation of a JKFF 429 is Q(t+1)=JQ'+K'Q. In a JKFF 429 the letter J is for "set" and the letter K is for "clear." Examples of the JKFF 429 include the SN74F109 manufactured by TI. As noted above, in an ISA based video system, the JKFF 429 receives a clock pulse (CP) input from the ISA clock 432. The output Q' (Q-not) of the JKFF 429 is connected to another inverter 431 whose output is fed into the MPC 220 (FIG. 2). The inverter 431 drives an interrupt line with an open collector output in compliance with the ISA standard.

The operation of the various components of the VDC 230 is described hereafter. When a VIS 204 is received by a BPF 410, the Transistor 422 is triggered and thereby charges C1 424. When the voltage signal across C1 (i.e., emitter voltage) reaches a logical state of level 1, then R1 421, NOR Gate 425, C2 426, and inverter 428 are activated to generate an input into J of the JKFF 429. The JKFF 429 receives the output of the inverter 428 and produces an interrupt over the ISA bus to the MPC 220 for action. Upon processing the interrupt by the MPC 220, the GPIO 240 reads the status of each VIS 204 through its respective JKFF 424 and transistor 422 connection. Once it reads the status of each VIS 204, the GPIO 240 resets the JKFF 424 through the K input. In case of more than one VIS 204, the GPIO 240 may reset one or more JKFF 424 simultaneously.

It is desirable to have the values of C1 424 and R2 423 be selected so that C1 424 maintains the logical state 1 despite and through momentary lapses in activity of the VIS 204. The duration of maintaining the logical state 1 across C1 424 may be in the order of few seconds. This duration aids in preventing the generation of another independent interrupt from an invariant video source, i.e., which has an essentially constant VIS 204. A typical value for C1 may be in the range of about 90–100 picofarads, and for R2 may be in the range of about 0.9–1 kOhms.

It is desirable to select values for C2 426 and R3 427 so that the inverter 428 outputs a pulse signal having a period equal to at least twice the period of the CP of the JKFF 429. The duration of at least twice the period of the CP ensures that the JKFF 429 captures a change in the logical state of the output signal of the inverter 428. The one-shot aspect of the IGC 420 refers to the ability of the IGC 420 not to output another signal until the voltage level across C1 424 falls below than and rises back to the logical state 1. Alternatively, a Schmitt trigger circuit (not shown in this figure) may be used to charge C1 424 to generate this type of logical state output. The design and implementation of a Schmitt trigger circuit is well known in the art.

If T is the duration of a one-shot pulse signal, C is a capacitance (i.e., C2 424), R is a resistor (i.e., R3 427), and Cf is the clock frequency of CP, then T=0.69*R*C and R*C=2/(0.69*Cf). Hence, for example, for a clock frequency of 33 MHz, then appropriate values are R3=910 Ohms, and C2=100 picofarads, thereby providing a pulse duration T=62.8 nanoseconds. It is desirable to have the clock pulse (i.e., CP) of the JKFF 429 be fast enough to ensure that the duration of the one-shot pulse signal terminates before the minimum interrupt response time of the video system. Having the one-shot pulse signal terminate in this manner avoids the generation of spurious interrupts when the JKFF 429 is reset.

Figure 5:
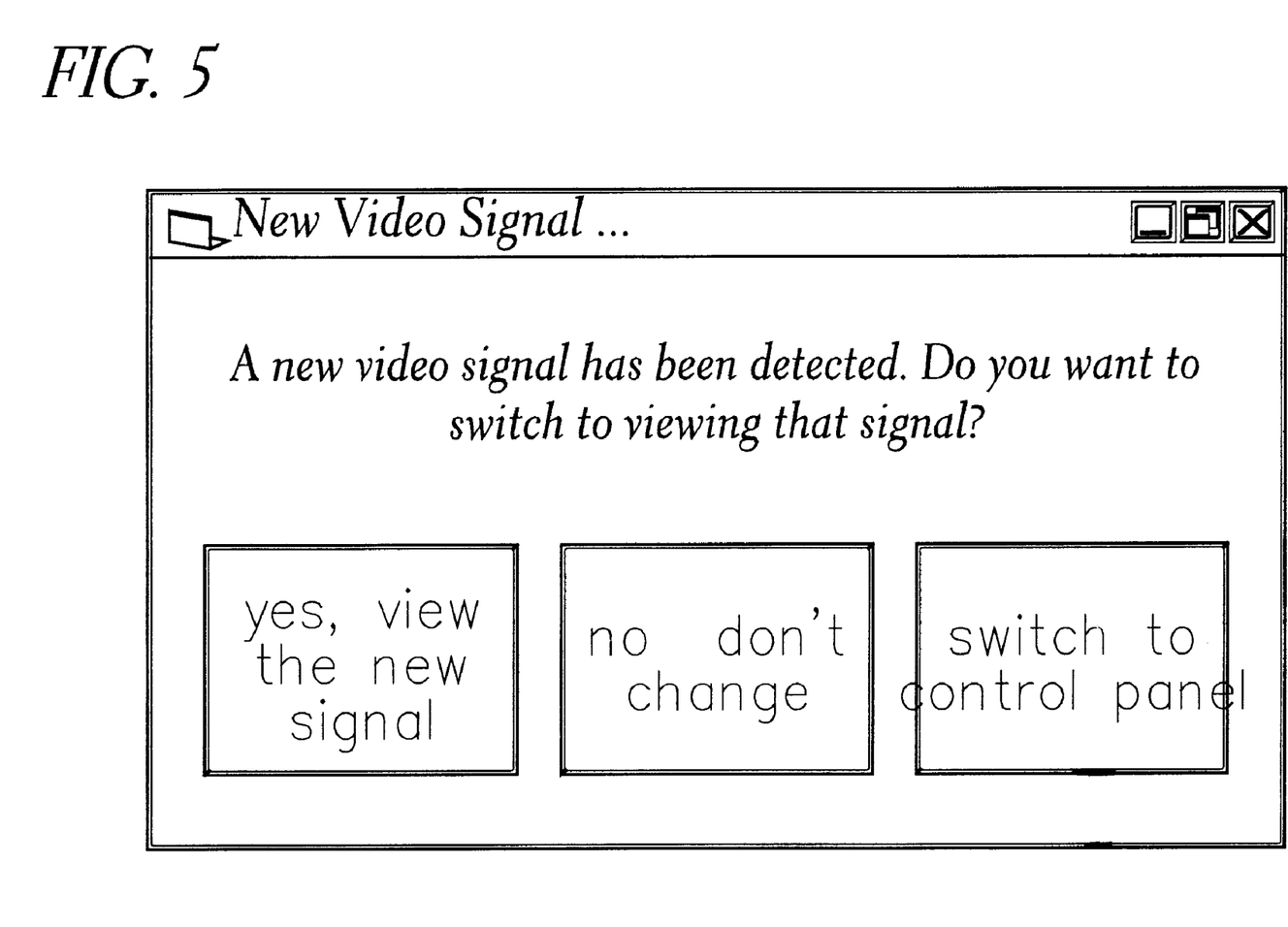
FIG. 5 is an exemplary screen display indicating the presence of one or more video signals in the video system of FIG. 2.

FIG. 5 is an exemplary screen display indicating the presence of one or more video signals in the video system of FIG. 2. As shown in FIG. 5, upon detecting the presence of a new VIS 204, the MPC 220 prompts the user to select whether to view the new signal or maintain current viewing status. The MPC 220 also prompts the user to switch to a control panel whereby the user may set default information such as selection of a video source. In this embodiment, the user makes a selection by simply clicking an appropriate button on the screen.

Figure 6:
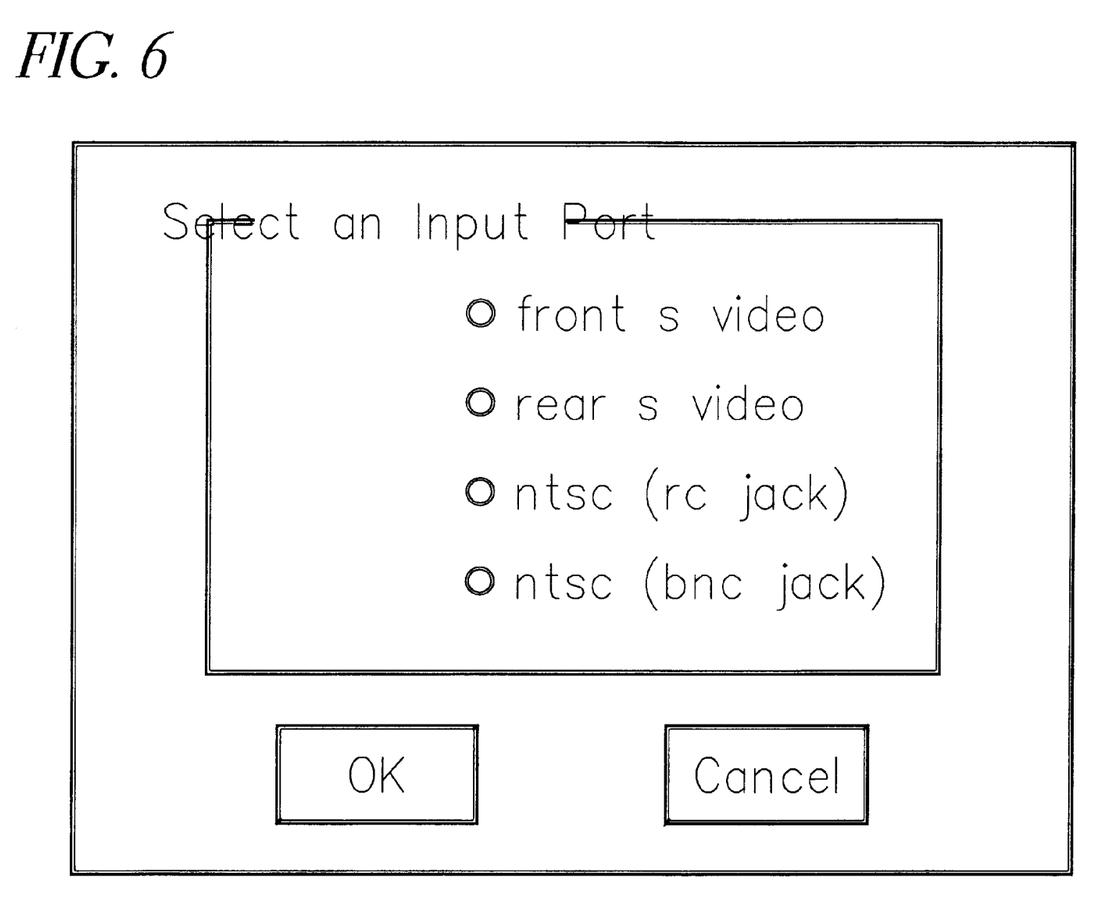
FIG. 6 is an exemplary screen display of a control panel of the video system of FIG. 2.

FIG. 6 is an exemplary screen display of a control panel of the video system 200. As shown in FIG. 6, a control panel allows a user to select a default video input port (i.e., a video source). The number of input ports may be limited by the number of various video sources available to the video system 200. In this embodiment, four video sources are shown: (1) Front S-Video; (2) Rear S-Video; (3) NTSC (RCA Jack); and (4) NTSC (BNC Jack). These video sources are provided to illustrate the kind and nature of video source selection and, hence, many other video sources may be selected. Moreover, the control panel may provide several other functions which a user may desire to control or set default values thereto.

In view of the foregoing, it will be appreciated that the invention overcomes the long-standing need for a system and method for selecting a desired video input in accordance with the desire of a user. The invention may be embodied in other specific forms without departing from its spirit or essential characteristics. The described embodiment is to be considered in all aspects only as illustrative and not restrictive. The scope of the invention is, therefore, indicated by the appended claims rather than by the foregoing description. All changes which fall within the meaning and range of equivalency of the claims are to be embraced within their scope.

What is claimed is:

1. A system for displaying video signals to a user, the system comprising:
   at least one detection circuit configured to monitor the arrival or presence of at least one of a plurality of video signals at at least one of a plurality of video inputs; and
   a processing circuit, electrically coupled to the detection circuit, configured to notify the user of the presence of at least one of the plurality of video signals,
   wherein, in the event that only one of the plurality of video signals is present, the processing circuit is configured to automatically select the only one of the plurality of video signals for display, and
   wherein, in the event that more than one of the plurality of video signals are present, the processing circuit is configured to prompt the user to select one of the more than one video signals for display.

2. The system of claim 1 further comprising a switch configured to connect the selected video signal to a display monitor for display.

3. The system of claim 1, wherein the processing circuit is configured to prompt the user to select a video signal during the display of another video signal.

4. The system of claim 1, wherein the detection circuit is configured to generate an interrupt signal upon the detection of the arrival of a video signal.

5. The system of claim 4, wherein the processing circuit is configured to cause display of a menu on a display monitor for the user to select the arriving video signal.

6. The system of claim 5, wherein the menu includes at least one of the options to view the arriving signal, view current video signal, and switch to a control panel.

7. The system of claim 1, wherein the plurality of video signals arrive at at least one of the plurality of video inputs via at least one of the following transmission media: cable TV, satellite TV, VHF/UHF TV, VCR cable, DVD cable, public Internet, and ATM network.

8. A system for displaying video signals to a user, the system comprising:

means for monitoring the arrival or presence of at least one of a plurality of video signals at at least one of a plurality of video inputs; and means for notifying the user of the presence of at least one of the plurality of video signals, wherein, in the event that only one of the plurality of video signals is present, the notifying means is configured to automatically select the only one of the plurality of video signals for display, and wherein, in the event that more than one of the plurality of video signals are present, the notifying means is configured to prompt the user to select one of the more than one video signals for display.

9. The system of claim 8 further comprising means for connecting the selected video signal to a display monitor for display.

10. The system of claim 8, wherein the notifying means is configured to prompt the user to select a video signal during the display of another video signal.

11. The system of claim 8, wherein the notifying means is configured to generate an interrupt signal upon the detection of the arrival of a video signal.

12. The system of claim 11, wherein the notifying means is configured to cause display of a menu on a display monitor for the user to select the arriving video signal.

13. The system of claim 8, wherein the plurality of video signals arrive at at least one of the plurality of video inputs via at least one of the following transmission media: cable TV, satellite TV, VHF/UHF TV, VCR cable, DVD cable, public Internet, and ATM network.

14. A method of displaying video signals to a user, the method comprising:

monitoring the arrival or presence of at least one of a plurality of video signals at at least one of a plurality of video inputs;

notifying the user of the presence of at least one of the plurality of video signals;

automatically selecting only one of the plurality of video signals for display, provided that only one of the plurality of video signals is present; and providing the user with an option to select one of the plurality of video signals for display, provided that more than one of the plurality of video signals are present.

15. The method of claim 14 further comprising connecting the selected video signal to a display monitor for display.

16. The method of claim 15, wherein the providing the user with the option to select a video signal occurs while another video signal is being displayed.

17. The method of claim 15, further comprising generating an interrupt signal upon the detection of the arrival of a video signal.

18. The method of claim 17, wherein notifying the user comprises displaying a menu on a display monitor for the user to select the arriving video signal.

19. The method of claim 18, wherein the menu includes at least one of the options to view the arriving signal, view current video signal, and switch to a control panel.

20. The method of claim 14, further comprising transmitting the plurality of video signals to at least one of the plurality of video inputs via at least one of the following transmission media: cable TV, satellite TV, VHF/UHF TV, VCR cable, DVD cable, public Internet, and ATM network.

* * * * *